Oct. 31, 1950 W. F. SANDS ET AL 2,528,182

FREQUENCY DISCRIMINATOR NETWORK

Filed Dec. 26, 1947 2 Sheets-Sheet 1

INVENTORS:
WILLIAM F. SANDS
& MURLAN S. CORRINGTON
BY Philip F. Cooper
ATTORNEY

Oct. 31, 1950 W. F. SANDS ET AL 2,528,182

FREQUENCY DISCRIMINATOR NETWORK

Filed Dec. 26, 1947 2 Sheets-Sheet 2

INVENTORS:
WILLIAM F. SANDS &
MURLAN S. CORRINGTON
BY Philip G. Cooper
ATTORNEY

Patented Oct. 31, 1950 2,528,182

UNITED STATES PATENT OFFICE 2,528,182

FREQUENCY DISCRIMINATOR NETWORK

William F. Sands and Murlan S. Corrington, Haddonfield, N. J., assignors to Radio Corporation of America, a corporation of Delaware Application December 26, 1947, Serial No. 794,028

11 Claims. (Cl. 250—27)

This invention relates generally to circuits for demodulating an angle-modulated carrier wave, and particularly relates to a frequency-discriminator network having a minimum response to the coincidental amplitude modulation of an angle-modulated carrier wave at its center frequency. A frequency-discriminator network in accordance with the present invention is suitable for use in conjunction with a ratio detector.

Various circuits have been devised in the past for demodulating an angle-modulated carrier wave. The term "angle-modulated carrier wave" is meant to include either a frequency-modulated or a phase-modulated carrier wave or hybrid forms of modulation possessing characteristics common to both of them. During the generation, transmission, or reception of an angle-modulated carrier wave, an undesired amplitude-modulation of the carrier may arise. This may be caused by the transmitter, by the combination of the signal with interfering impulses such as external noise, by the lack of uniform gain over the entire pass band of the signal selector, or, finally, the undesired amplitude modulation may be caused by interference of the waves which have traveled over different paths between the transmitter and the receiver.

Most prior art demodulators for angle-modulated carrier waves are also responsive to amplitude modulation. The ratio detector, however, which is a particular type of frequency discriminator or demodulator, is in first approximation not responsive to the undesired amplitude modulation of an angle-modulated carrier wave.

A conventional ratio detector of the type referred to has been described on pages 140 to 147 of the book "F-M Simplified," by Milton S. Kiver, published in 1947 by D. Van Nostrand Co., Inc., New York, New York.

The ratio detector thus eliminates the need of a limiter stage required in other conventional frequency demodulators to remove the normally present coincidental amplitude modulation of an angle-modulated carrier wave. Since a limiter stage limits the amplitude of the modulated carrier wave, less amplification is required in a radio receiver ahead of a ratio detector, than is required when other conventional frequency demodulator circuits which utilize a limiter are employed in the receiver. Consequently, a radio receiver including a ratio detector requires less tubes and circuit elements than a receiver having a conventional frequency demodulator. Furthermore, a conventional frequency demodulator is responsive to the difference between the voltages developed by two rectifiers, while the ratio detector responds to the ratio of the two voltages, and this ratio remains constant, in first approximation, regardless of variations in amplitude of the modulated carrier-wave. It has been found, however, that the frequency-discriminator network forming part of a ratio detector is responsive to a certain extent to variations of the amplitude of the modulated carrier wave.

It is, accordingly, an object of the present invention to provide an improved frequency-discriminator network suitable particularly for use with a ratio detector.

A further object of the invention is to minimize the response of a frequency-discriminator network to variations in amplitude of the impressed angle-modulated carrier wave.

Another object of the invention is to provide a frequency-discriminator network which has a minimum response to amplitude modulation at the center frequency of the angle-modulated carrier wave impressed thereon.

A frequency discriminator network conventionally includes a transformer having a primary and a secondary coil, one of or both of which may be tuned to the center frequency of an angle-modulated carrier wave. When the carrier wave is impressed on the transformer, the voltages developed across each of the two coils are inherently approximately but not exactly 90 degrees out of phase at the center frequency of the angle modulated carrier wave. It has been found that a frequency-discriminator network will have a minimum response to coincidental variations in amplitude of the modulated carrier-wave at the center frequency of the wave if the voltages in the two transformer coils are exactly 90 degrees out of phase at that frequency. In accordance with the present invention, this may be accomplished by coupling a phase-shifting network or an impedance element having a reactive component to the two coils of the transformer of the frequency-discriminator network. The phase shifting network or reactive impedance element will then shift the phase between the two voltages to exactly 90 degrees at the center frequency.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 5 is a vector diagram referred to in explaining the operation of the circuit of Fig. 4.

Figure 1:
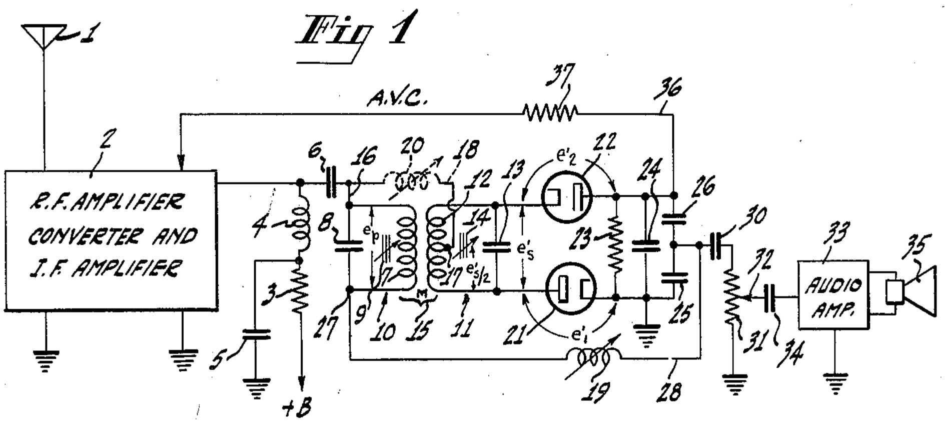
Fig. 1 is a circuit diagram, partly in block form, of a radio receiver including a frequency-discriminator network embodying the present invention and forming part of a ratio detector.

Referring now to Fig. 1 there is illustrated a super-heterodyne radio receiver adapted to receive an angle-modulated carrier wave which may be intercepted by antenna 1. The carrier wave may be amplified by one or more radio frequency amplifiers, converted to an intermediate frequency wave and further amplified by one or more intermediate frequency amplifiers, the necessary components being generally indicated by box 2, in accordance with conventional practice.

It will be understood that radio-frequency amplifier, converter and intermediate-frequency amplifier 2 are adapted to receive and amplify not only frequency-modulated carrier waves but also phase-modulated waves. A frequency-modulated wave is developed at a transmitter by varying the frequency of the carrier wave about its center or mean frequency in proportion to the amplitude of the modulating signal and at a speed depending upon the frequency of the modulating signal. A phase-modulated wave differs from a frequency-modulated wave in that the frequency deviation from the center frequency increases with the frequency of the modulating signal. Thus, the generic expression "angle modulation" also includes a modulated carrier-wave of preferably constant amplitude where the modulation contains components resembling both frequency and phase modulation and is therefore a hybrid modulation.

The intermediate-frequency wave to which the intercepted carrier-wave is converted has conventionally a frequency of 10.7 megacycles in present frequency-modulated carrier-wave receivers. The plate of the last intermediate-frequency amplifier or driver stage is connected to a suitable source of positive voltage indicated at +B through anode resistor 3 and radio frequency choke coil 4 having their junction point grounded for radio frequencies by bypass condenser 5. The intermediate-frequency wave is impressed by coupling condenser 6 upon primary resonant circuit 10 including coil 7 and condenser 8 arranged in parallel. Primary coil 7 of resonant circuit 10 may be tuned or adjusted by a magnetically permeable core or slug 9 to the intermediate frequency. Preferably, primary circuit 10 is broadly tuned to have a pass band approximately equal to the distance between two adjacent stations, and which is 200 kilocycles according to present standards. It is to be understood that the capacitance of condenser 8 may be represented partly or entirely by the distributed capacitance of primary coil 7 and by the inter-electrode capacitance of the last intermediate-frequency amplifier or driver stage.

The frequency-discriminator network further comprises besides primary resonant circuit 10, secondary resonant circuit 11 including secondary coil 12 and condenser 13 connected in parallel. Secondary coil 12 of resonant circuit 11 may also be tuned or adjusted to the center frequency, that is, to 10.7 megacycles by slug 14. Preferably, secondary coil 12 is wound as a bifilar coil so that movement of slug 14 will not unbalance coil 12. Primary coil 7 and secondary coil 12 are inductively coupled to each other as indicated at 15 and form a transformer. Primary circuit 10 and secondary circuit 11 are thus mutually coupled to each other.

The high alternating potential terminal 16 of primary circuit 10 is connected to the mid-point 17 of secondary coil 12 by lead 18. In accordance with the present invention and for a purpose to be explained hereinafter, an impedance element having a reactive component, that is, a phase shifting network may be provided in lead 18. As illustrated in dotted lines in Fig. 1 the reactive impedance element comprises adjustable coil 20.

The frequency discriminator network which includes primary circuit 10 mutually coupled to secondary circuit 11 is connected to a rectifier circuit including rectifiers 21 and 22 which, as illustrated, may be diodes, or twin diodes or crystal rectifiers. The anode of diode 21 and the cathode of diode 22 are connected respectively, to the terminals of secondary circuit 11. The cathode of diode 21 and the anode of diode 22 are interconnected through resistor 23 and bypassed by stabilizing condenser 24. Stabilizing condenser 24 has a sufficiently large capacitance that it presents a low impedance path to both the intermediate and the audio frequency currents. The time constant of resistor 23 and stabilizing condenser 24 is of the order of 0.2 second so that the voltage across resistor 23 and condenser 24 is allowed to vary slowly in accordance with the time constant but is maintained constant for short time variations.

Between the cathode of diode 21 and the anode of diode 22 there are provided two load condensers 25 and 26 of substantially equal capacitance. Load condensers 25 and 26 present a low impedance for the audio signal. The junction point of load condensers 25 and 26 is conductively connected to the low alternating potential terminal 27 of primary circuit 10 by lead 28. Instead of providing adjustable coil 20 in lead 18, adjustable coil 19 may alternatively be arranged in lead 28. Since the cathode of diode 21 is grounded, as illustrated, the junction point of load condensers 25, 26 is at an intermediate-frequency ground potential and so is the low alternating-potential terminal 27 of primary circuit 10. It is to be understood, however, that ground may be applied to any point or terminal of resistor 23.

Figure 4:
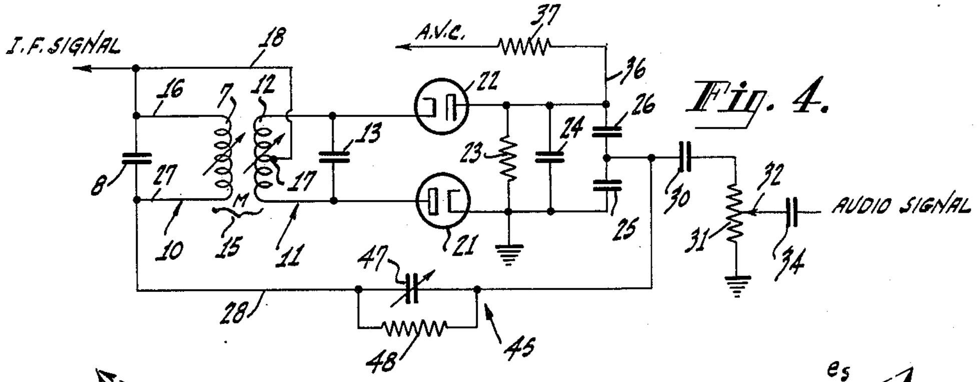
Fig. 4 is a circuit diagram of a modified frequency-discriminator network in accordance with the present invention and forming part of a ratio detector.

When the ratio detector circuits of Fig. 1 or 4 are intended for the demodulation of a phase-modulated carrier wave, the frequency-discriminator network of the present invention should be made responsive to phase deviations and will then function as a phase-discriminator network.

With the exception of adjustable coil 20 or alternatively adjustable coil 19, the ratio detector circuit described operates in a conventional manner. At the center frequency the current flowing through diodes 21 and 22 are equal in magnitude, and no audio output signal is developed. However, when the intermediate-frequency carrier wave deviates from the center frequency, the frequency-discriminator network becomes unbalanced, and the currents flowing through diodes 21 and 22 differ from each other in magnitude. The total voltage developed across both load condensers 25 and 26 in series is maintained substantially constant by stabilizing condenser 24 and resistor 23. Therefore, the voltage of the junction point between load condenser 25 and 26 varies with the frequency of the input signal, and, consequently, the audio signal is developed across load condenser 25. By means of coupling condenser 30 the audio signal is impressed upon load resistor 31 having one terminal connected to ground. The audio signal may be obtained from tap 32 which is variable for adjusting the audio volume and may be impressed upon audio amplifier 33 through coupling condenser 34. The audio signal may then be reproduced by loud speaker 35.

An automatic volume control voltage is developed across both load condensers 25, 26 and may be derived from the anode of diode 22 by lead 36 and impressed through filter resistor 37 upon one or more of the radio-frequency and intermediate-frequency amplifier stages, which is conventional. The automatic volume control voltage is of negative polarity.

The ratio detector illustrated in Fig. 1 without adjustable coil 19 or 20 is to some extent also responsive to coincidental amplitude modulation of the impressed intermediate-frequency wave. It is very important that the ratio detector circuit should have a minimum response to amplitude modulation at the center frequency of the intermediate-frequency wave. It has been found that the minimum response of a frequency-discriminator network of the type illustrated in Fig. 1 to an amplitude-modulation signal occurs at a frequency where the voltage in primary coil 7 is exactly 90 degrees out of phase with that in secondary coil 12. Provided secondary coil 12 is accurately center-tapped, and provided further that there is no stray capacitive coupling but only inductive coupling between primary circuit 10 and secondary circuit 11, the frequency at which there is a maximum rejection of amplitude-modulation signals is slightly higher than the center frequency.

The angular frequency $\omega$ at which the response to amplitude modulation of the frequency-discriminator network is a minimum is determined by the following equation:

$$\omega=\frac{\omega_0}{\sqrt{1-K^2}}$$

where $$\omega_0=\frac{1}{\sqrt{L_1C_1}}=\frac{1}{\sqrt{L_2C_2}} \text{ and } k^2=\frac{M^2}{L_1L_2}$$

$L_1$ and $L_2$ are respectively the inductance of primary coil 7 and of secondary coil 12, while $C_1$ and $C_2$ represent respectively the capacitance of condensers 8 and 13. M is the mutual coupling of transformer coils 7 and 12 as indicated in Fig. 1 so that $k$ represents a coupling factor. From the above equation it will be seen that $\omega$ approaches $\omega_0$ when $k$ approaches 0, that is, when M approaches 0. However, normally $\omega_0$ will be above the center frequency.

Figure 2:
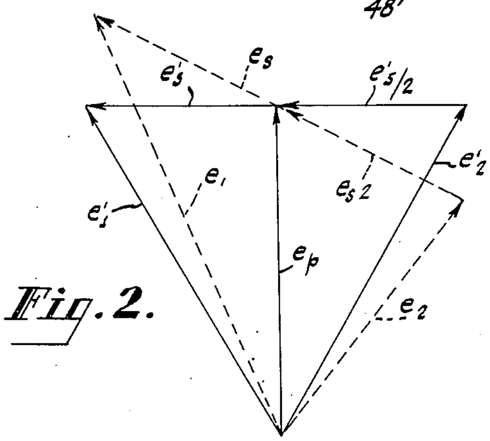
Fig. 2 is a vector diagram referred to in explaining the operation of the circuit of Fig. 1.

This effect may be understood more clearly by reference to Fig. 2. Normally, that is, without either adjustable coil 20 or 19, the primary voltage $e_p$ (Fig. 1) of the intermediate-frequency wave is not 90 degrees out of phase with respect to the secondary voltage $e_s$ of the intermediate-frequency wave developed across secondary coil 12 as illustrated vectorially in Fig. 2. The voltage $e_s/2$ has also been indicated in Fig. 2 and represents the voltage between midpoint 17 of secondary coil 12 and one of its terminals. The resulting intermediate-frequency voltages $e_1$ and $e_2$ which are the voltages developed across diodes 21 and 22 respectively are also shown in Fig. 2. It is to be understood that the vector diagram of Fig. 2 illustrates the intermediate-frequency voltages at the center frequency and that the deviation of the angle between $e_p$ and $e_s$ from 90 degrees has been exaggerated.

Figure 3:
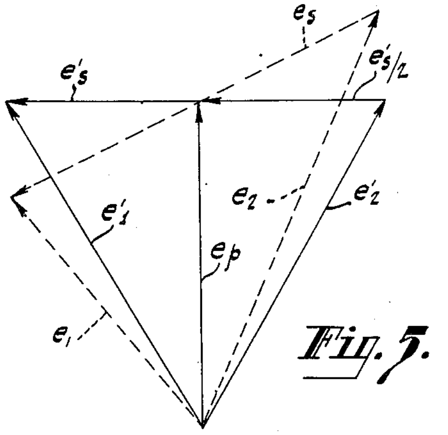
Fig. 3 is a graph showing curves obtained with the circuit of Fig. 1.
Figure 7:
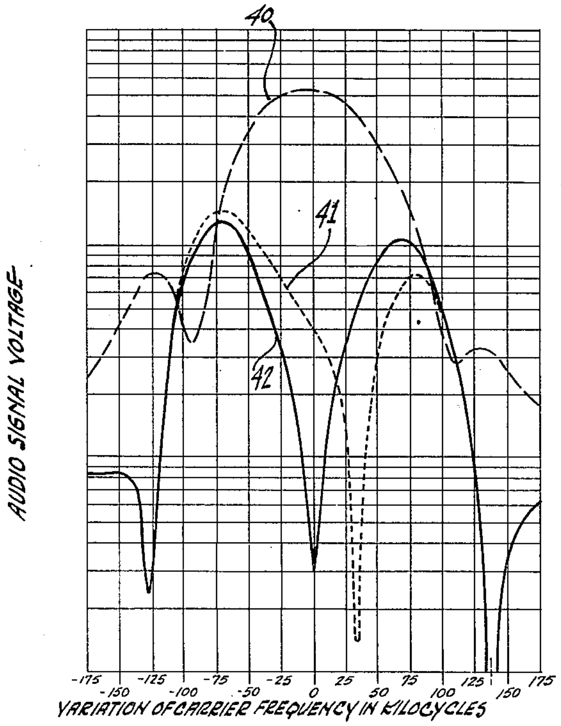

Referring now to Fig. 3 there is shown curve 40 illustrating the audio signal voltage derived from the circuit of Fig. 1 in response to variation of the center or carrier frequency of the input wave having a frequency deviation of ±22.5 kilocycles which is varied at the rate of 400 cycles per second. Curve 41 of Fig. 3 has also been obtained with the circuit of Fig. 1 without either adjustable coil 20 or 19. Curve 41 represents the audio signal voltage plotted against variations of the carrier frequency of an input signal having a 30 per cent amplitude modulation varying at the rate of 400 cycles per second. It will be seen that for this particular circuit arrangement the minimum response to the amplitude-modulated carrier wave occurs at a carrier frequency which is 34 kilocycles higher than the center frequency. The ratio between the audio signals obtained in response to a frequency-modulated signal and to an amplitude-modulated signal at the center frequency is only 22 decibels (db).

From the above explanation it will be obvious that the minimum response of the frequency-discriminator network to an amplitude-modulated signal can be shifted to the center frequency provided the voltages in primary coil 7 and secondary coil 12 are exactly 90 degrees out of phase at the center frequency. For this purpose there is provided in accordance with the present invention an inductive reactance such as adjustable coil 20 which may, as illustrated in Fig. 1, be connected between high alternating potential terminal 16 of primary circuit 10 and mid-point 17 of secondary coil 12. Adjustable coil 20 serves as an inductive reactance or as a phase shifting network. Curve 42 of Fig. 3 was obtained under the same conditions as was curve 41 except that the circuit was provided with coil 20. In other words, the input wave impressed on the circuit of Fig. 1 had a 30 per cent amplitude modulation varying at the rate of 400 cycles per second. It will be seen from curve 42 that the response of the frequency-discriminator circuit to amplitude modulation is now a minimum at the center frequency and is substantially symmetrical on both sides of the center frequency. The response of the circuit to an amplitude-modulated signal is, accordingly, a minimum. The inductance of coil 20 should, accordingly, be adjusted until the response of the circuit to amplitude modulation is as shown by curve 42.

Fig. 2 also shows that the secondary voltage $e_s'$, which is developed when the circuit of Fig. 1 is provided with adjustable coil 20, now is exactly at right angles with the primary voltage $e_p$ at the center frequency. The voltages $e_1'$ and $e_2'$ developed across diodes 21 and 22 in the circuit of Fig. 1 are now of equal magnitude at the center frequency.

The primary voltage $e_p$ may change in magnitude when the adjustable coil 19 or 20 is added to the ratio detector. However, in Fig. 2 the magnitude of the voltage vector $e_p$ has been illustrated as being equal with or without one of the adjustable coils.

It is to be understood that instead of adjustable coil 20, an adjustable coil 19 may be provided in lead 28 between low alternating potential terminal 27 of primary circuit 10 and the junction point of load condensers 25, 26, as illustrated. In that case, adjustable coil 19 is in series with secondary circuit 11 and primary circuit 10 or, in other words, coil 19 is connected between one of the terminals of primary circuit 10 and the junction point between load condensers 25, 26 which is at intermediate frequency ground potential.

It frequently happens that the coupling between primary circuit 10 and secondary circuit 11 is not primarily inductive but capacitive due to the particular design of the transformer which may have stray capacitive coupling. In that case, the minimum response of the frequency-discriminator network may occur at a frequency which is lower than the center frequency. The same result is obtained if secondary coil 12 is not accurately centertapped. Referring now to Fig. 4, in which like components are designated by the same reference numerals as were used in Fig. 1, there is illustrated a ratio detector having a frequency discriminator network with a predominantly capacitive coupling.

The intermediate-frequency wave is impressed by lead 18 upon primary circuit 10 which may, for example, be connected to coupling condenser 6 in the manner illustrated in Fig. 1. The high alternating potential terminal 16 of primary circuit 10 is connected by lead 18 to mid-point 17 of secondary coil 12. Primary coil 7 and secondary coil 12 are mutually coupled as indicated at 15, and the stray capacitive coupling of the transformer predominates. The rectifier circuit connected to the frequency-discriminator network is identical with that illustrated in Fig. 1. The automatic volume control voltage is again obtained from lead 36 and filter resistor 37 while the audio signal is derived from the junction point between load condensers 25 and 26. It is assumed, however, that the coupling between primary circuit 10 and secondary circuit 11 is primarily capacitive which may be caused by stray capacitive coupling or by coil 12 not being accurately centertapped.

Figure 6:
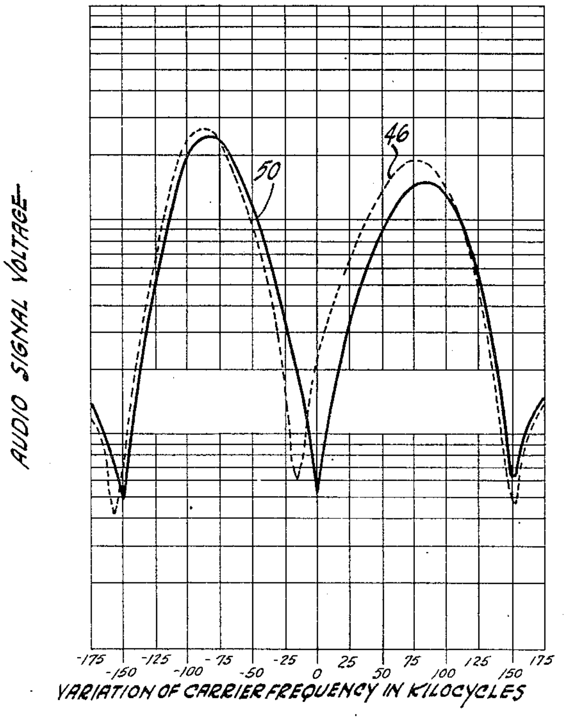
Fig. 6 is a graph illustrating curves obtained with the circuit of Fig. 4.

Disregarding for the moment phase shifting network 45 in lead 28 which is an impedance having a capacitive reactance component, the primay voltage $e_p$ and the secondary voltage $e_s$ at the center frequency have been illustrated vectorially in Fig. 5. It will be seen that the two voltages are less than 90 degrees out of phase, and consequently the voltages $e_1$ and $e_2$ are not equal in magnitude. Curve 46 of Fig. 6 illustrates the audio signal voltage obtained with the circuit of Fig. 4 without network 45 for variations in carrier frequency when the input wave has a 30 per cent amplitude modulation varying at the rate of 400 cycles per second. The minimum response occurs at a frequency which is approximately 15 kilocycles below the center frequency.

By providing phase shifting network 45, which consists of adjustable condenser 47 and resistor 48 arranged in parallel, that is, a capacitive reactance, the minimum response of the frequency-discriminator network to amplitude modulation may be shifted or adjusted to occur at the center frequency as shown by curve 50 of Fig. 6 which represents the audio signal voltage obtained with the circuit of Fig. 4 including reactive impedance 45. Resistor 48 may have a resistance of between 100 to 5,000 ohms while the capacitance of adjustable condenser 47 used in a representative circuit was 560 micromicrofarads although different transformer designs may require wide departure from this value. It is to be understood that although resistor 48 serves to modify the operation of the phase shifting network and facilitates the adjustment of phase shifting network 45 as to the required reactive impedance it is not essential for the operation of the phase shifting network.

It is further to be understood that phase shifting network 45 may be provided in lead 18 instead of being inserted in lead 28. The operation of the circuit will be identical to that described above.

When phase shifting network 45 of the proper reactive impedance is provided as illustrated in Fig. 4, the secondary voltage $e_s'$ is exactly 90 degrees out of phase with the primary voltage $e_p$ as shown in Fig. 5. The voltages $e_1'$ and $e_2'$ developed across diodes 21 and 22 are now equal in magnitude at the center frequency.

It will be understood that the frequency-discriminator network of the present invention may also be used with other types of detectors or rectifier circuits or for other purposes, although it is particularly useful in conjunction with a ratio detector. The phase relationships between the voltages in the primary and secondary coils of a transformer are of particular importance whenever the primary and secondary circuits have a low Q-value, where Q is the reactance divided by the effective resistance of a circuit. For example, in a ratio detector the frequency-discriminator network is heavily loaded by the rectifier circuit, and its load varies with the frequency of the input wave. Similar conditions are prevalent when a frequency-discriminator network is heavily loaded for the purpose of obtaining a large pass band. Under these and similar circumstances the frequency-discriminator network of the present invention may be utilized with advantage.

What is claimed is:

1. A frequency discriminator network including a transformer having a primary and a secondary inductance element, a source of a carrier wave having a predetermined frequency and being coupled to said primary inductance element to induce a voltage across said primary and said secondary inductance element, a capacitance element coupled to said secondary inductance element for tuning it to said frequency, whereby the voltages across said inductance elements at said frequency are approximately 90 degrees out of phase, and a phase shifting network providing an effective reactive impedance coupled to said inductance elements for shifting the phase between said voltages at said frequency to 90 degrees.

2. A frequency discriminator network including a primary and a secondary circuit mutually coupled to each other, a source of a carrier wave having a predetermined frequency and being coupled to said primary circuit to induce a voltage across said primary and said secondary inductance element, said secondary circuit being tuned to said frequency, whereby the voltages across said primary and secondary circuits at said frequency are approximately 90 degrees out of phase, and a phase shifting network having a reactive component effectively connected to said primary and secondary circuits for shifting the phase between said voltages at said frequency to 90 degrees.

3. In a ratio detector, a frequency discriminator network including a transformer having a primary and a secondary inductance element, a source of an angle-modulated carrier wave having a center frequency and being coupled to said primary inductance element to induce a voltage across said primary and said secondary inductance element, capacitance elements coupled to said inductance elements for tuning them to said frequency, whereby the voltages across said primary and secondary inductance elements at said frequency are approximately 90 degrees out of phase, and a reactive impedance element effectively connected between said inductance elements and adjusted to change the phase between said voltages at said frequency to 90 degrees, thereby to reduce the response of said detector to an amplitude-modulated signal at said center frequency to a minimum.

4. The combination of a source of an angle-modulated carrier wave having a center frequency with a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, and a phase shifting network including such a reactive component effectively connected in series with a terminal of said primary circuit and the mid-point of said secondary circuit as to shift the phase between said voltages at said center frequency to 90 degrees.

5. The combination of a source of an angle-modulated carrier wave having a center frequency with a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, and a phase shifting network including an inductive reactance component connected between a terminal of said primary circuit and the mid-point of said secondary circuit for changing the phase between said voltages at said center frequency to 90 degrees.

6. The combination of a source of an angle-modulated carrier wave having a center frequency with a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, and a phase shifting network including a capacitive reactance component connected between a terminal of said primary circuit and the mid-point of said secondary circuit for changing the phase between said voltages at said center frequency to 90 degrees.

7. In a ratio detector, the combination of a source of an angle-modulated carrier wave having a center frequency with a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, and a phase shifting network including such a reactive component connected between a terminal of said primary circuit and the mid-point of said secondary circuit as to shift the phase between said voltages at said center frequency to 90 degrees.

8. The combination of a source of an angle-modulated carrier wave having a center frequency with a ratio detector including a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, said detector having a point substantially at carrier frequency ground potential, a conductive connection between one terminal of said primary circuit and the mid-point of said secondary circuit, and an impedance element including such a reactive component connected between the other terminal of said primary circuit and said point as to shift the phase between said voltages at said center frequency to 90 degrees, thereby to minimize the response of said detector to an amplitude-modulated signal at said center frequency.

9. The combination of a source of an angle-modulated carrier wave having a center frequency with a ratio detector including a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, said detector having a point substantially at carrier frequency ground potential, a conductive connection between one terminal of said primary circuit and the mid-point of said secondary circuit, and an impedance element including such an inductive reactance component connected between the other terminal of said primary circuit and said point as to shift the phase between said voltages at said center frequency to 90 degrees, thereby to minimize the response of said detector to an amplitude-modulated signal at said center frequency.

10. The combination of a source of an angle-modulated carrier wave having a center frequency with a ratio detector including a frequency discriminator network comprising a primary and a secondary resonant circuit mutually coupled to each other and tuned to said center frequency, the voltages induced by said wave across said primary and secondary circuits being normally approximately 90 degrees out of phase at said center frequency, said detector having a point substantially at carrier frequency ground potential, a conductive connection between one terminal of said primary circuit and the mid-point of said secondary circuit, and an impedance element including such a capacitive reactance component connected between the other terminal of said primary circuit and said point as to shift the phase between said voltages at said center frequency to 90 degrees, thereby to minimize the response of said detector to an amplitude-modulated signal at said center frequency.

11. In a ratio detector, the combination of a source of an angle-modulated carrier wave having a center frequency with a frequency discriminator network comprising a primary and a secondary resonant circuit mutually coupled to each other and tuned to said center frequency, the voltages induced by said wave across said circuits being normally approximately 90 degrees out of phase at said center frequency, said detector having a point substantially at carrier frequency ground potential, a conductive connection between one terminal of said primary circuit and the mid-point of said secondary circuit, and an adjustable phase shifting network including a reactive component connected between the other terminal of said primary circuit and said point for adjusting the phase between said voltages at said center frequency to 90 degrees, thereby to minimize the response of said detector to an amplitude-modulated signal at said center frequency.

WILLIAM F. SANDS.
MURLAN S. CORRINGTON.

REFERENCES CITED

The following references are of record in the file of this patent:

UNITED STATES PATENTS

| Number | Name | Date |
|---|---|---|
| 2,173,907 | Kirkwood | Sept. 26, 1939 |
| 2,243,414 | Carlson | May 27, 1941 |
| 2,282,104 | Tunick | May 5, 1942 |
| 2,338,526 | Maynard | Jan. 4, 1944 |
| 2,363,652 | Crosby | Nov. 28, 1944 |
| 2,411,605 | Webb | Nov. 26, 1946 |